Dec. 2, 1958     H. H. F. AHRENS     2,863,015
STEERING WHEEL
Filed May 23, 1955
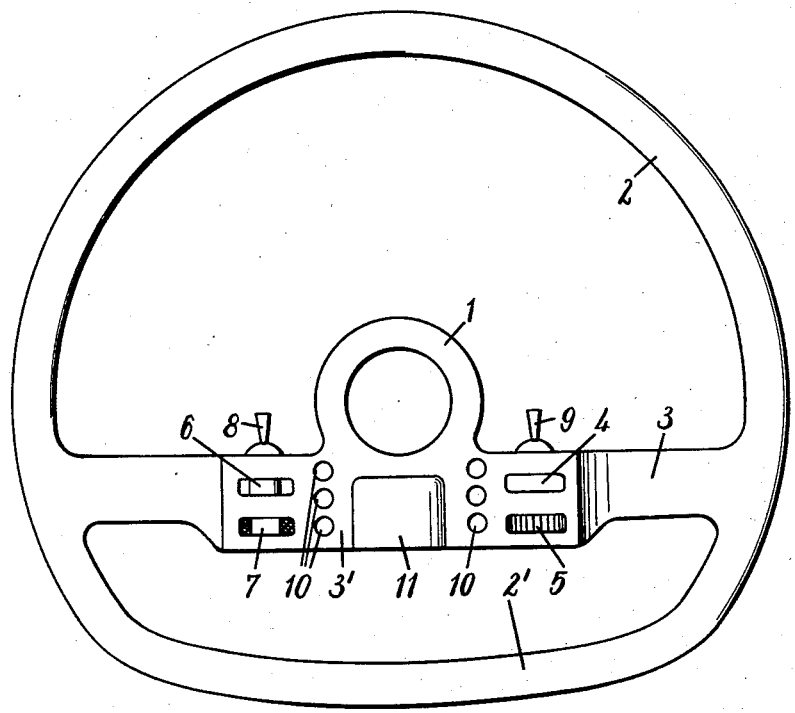
INVENTOR
HERMANN H. F. AHRENS
BY    Dicke and Cay
ATTORNEYS.

United States Patent Office 2,863,015
Patented Dec. 2, 1958

2,863,015

STEERING WHEEL

Hermann H. F. Ahrens, Sindelfingen, Kreis Boblingen, Germany

Application May 23, 1955, Serial No. 510,326
In Germany October 13, 1948

Public Law 619, August 23, 1954
Patent expires October 13, 1968

5 Claims. (Cl. 200—61.54)

The present invention relates to a steering wheel for motor vehicles having a spoke for mounting thereon the electric switches for operating the electrical equipment of the vehicle.

It is an object of the present invention to mount all the essential electric switches on a spoke of the steering wheel which extends in a horizontal direction when the wheels of the vehicle are in a straight-driving position so that the driver of the vehicle can operate these switches without taking his hands off the steering wheel, and these most essential switches will lie substantially within his straight line of vision and he will hardly be required to take his eyes away from the road to observe their position.

It is a further object of the present invention to flatten the circular rim of the steering wheel on the side facing the driver so that his hand gripping such flattened or straightened rim portion will at all times be within easy reach of, and at substantially the same distance from all of the switches on the horizontal spoke so that he will be able to reach and operate them without taking his eyes from the road.

A further object of the present invention is also to mount the pilot lights, fuses, and similar equipment on the horizontal wheel spoke so as to be easily visible and easily accessible at any time, and also to facilitate their installation considerably.

Another object of the invention is to provide at least some of the switches with flat keys with differently shaped or differently embossed surfaces so that the driver, particularly when driving by night, can distinguish them from each other merely by his sense of touch.

Further objects, features, and advantages will be apparent from the following detailed description thereof, as well as from the accompanying drawing showing diagrammatically one specific embodiment of a steering wheel according to the invention.

Referring to the drawing, the steering wheel according to the invention consists of the hub 1, the rim 2 in the general form of a truncated ring or annulus, and a spoke 3 which in the particular example as shown extends below the hub 1 in the direction of a normally horizontal secant of a circle. This, however, does not exclude the possibility of providing the spoke in the direction of the diameter as customary. In its central part 3', spoke 3 is widened so as to form a casing, on the surface of which switch elements are provided in the form of keys. Thus, for example, the key 4 may be for operating the horn, key 5 for changing from the city lights to the bright lights, key 6 for the foglights, and key 7 for operating the heater. Additional switch elements in the form of toggle handles may be placed laterally of the spoke 3, that is, within the plane of the wheel. Toggle handle 8 may serve, for example, for operating the direction indicator, while the other toggle handle 9 may operate the windshield wiper. Small signal or pilot lights 10 for different purposes may also be provided on the spoke 3. In the center of the spoke 3 a little compartment closed by a removable cover 11 might also be provided within which those fuses which more frequently require replacement may be mounted. The hub of the steering wheel may either carry the customary button for operating the horn or it may carry an instrument, such as the speedometer or the like.

The switch keys 3 to 7 preferably are given different surface shapes; they may, for example, be differently embossed or indented so that the driver will be able to distinguish them from each other in the dark purely by his sense of touch.

The lower part 2' of the wheel next to the driver is preferably shortened so as to extend substantially parallel, although curved slightly downwardly relative to the spoke 3. In ordinary driving, the driver will grip the steering wheel by this substantially horizontal truncated portion 2' which is preferably placed sufficiently close to the spoke 3 so that his fingers will be within easy reach of the switch elements permitting him to operate the same without requiring him to remove his hands from the wheel portion 2'.

The present invention is in its application not restricted to mechanical steering apparatus but may with particular advantage also be used for those using, for example, hydraulic steering implements.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. A steering wheel for motor vehicles having a rim, a hub, one normally horizontal spoke, and electrical instruments required for operating the vehicle while driving, said electrical instruments being mounted on said hub and said spoke, said rim having a substantially flattened portion extending substantially parallel with said spoke on the side of said rim normally adjacent the driver, said spoke forming a secant of said rim portion and being disposed on a part of said hub nearest the driver, said electrical instruments on said spoke and said hub being disposed at a distance from said flattened portion substantially within reach of the fingers of the driver's hand gripping said flattened portion without requiring removal of said hand therefrom.

2. A steering wheel for motor vehicles having a rim, a hub, only one normally horizontal spoke, and the electric switches required for operating the vehicle while driving the same as well as pilot lights mounted on said spoke, said spoke further having a compartment therein with a removable lid thereon for holding fuses.

3. A steering wheel for motor vehicles having a rim, a hub, only one normally horizontal spoke, and the electric switches required for operating the vehicle while driving the same being mounted on said spoke, at least some of said switches having substantially flat lever-type push buttons mounted on the upper flat surface of said spoke.

4. A steering wheel for motor vehicles having a rim, a hub, only one normally horizontal spoke, and the electric switches required for operating the vehicle while driving the same being mounted on said spoke, at least some of said switches having substantially flat lever-type push buttons mounted on the upper flat surface of said spoke, and having differently embossed surfaces so as to permit them to be distinguished from each other by the sense of touch.

5. A steering wheel for motor vehicles having a rim, a hub, only one normally horizontal spoke, and the electric switches required for operating the vehicle while driving the same being mounted on said spoke, some of said switches having toggle handles substantially extending within the plane of said wheel, and some of said switches having substantially flat lever-type push buttons mounted on the upper flat surface of said spoke and having differently embossed surfaces so as to permit them to be distinguished from each other by the sense of touch.

References Cited in the file of this patent

UNITED STATES PATENTS

| | | |
|---|---|---|
| 1,093,441 | Laurance | Apr. 14, 1914 |
| 1,130,933 | Rupert | Mar. 9, 1915 |
| 1,476,347 | Martin | Dec. 4, 1923 |
| 1,699,392 | Fisher | Jan. 15, 1929 |
| 2,207,736 | Hollingsworth | July 16, 1940 |
| 2,269,492 | Sorensen | Jan. 13, 1942 |
| 2,491,968 | Gilbert | Dec. 20, 1949 |
| 2,518,175 | Pinardi | Aug. 8, 1950 |

FOREIGN PATENTS

| | | |
|---|---|---|
| 215,613 | Great Britain | May 15, 1924 |
| 670,492 | France | Aug. 19, 1929 |